US012720216B2

(12) United States Patent
Cha et al.

(10) Patent No.: US 12,720,216 B2
(45) Date of Patent: Aug. 25, 2026

(54) CAMERA MODULE FOR CALIBRATING IMAGE DATA, OPERATING METHOD OF CAMERA MODULE, AND ELECTRONIC DEVICE INCLUDING CAMERA MODULE

(71) Applicant: SAMSUNG ELECTRONICS CO., LTD., Suwon-si (KR)

(72) Inventors: Sung-Ho Cha, Suwon-si (KR); Daeil Yu, Suwon-si (KR); Kundong Kim, Suwon-si (KR); Suhyun Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 18/125,872

(22) Filed: Mar. 24, 2023

(65) Prior Publication Data

US 2024/0073548 A1 Feb. 29, 2024

(30) Foreign Application Priority Data

Aug. 30, 2022 (KR) ........................ 10-2022-0109452

(51) Int. Cl.
*H04N 25/13* (2023.01)
*H04N 25/62* (2023.01)
*H04N 25/767* (2023.01)

(52) U.S. Cl.
CPC ........... *H04N 25/135* (2023.01); *H04N 25/62* (2023.01); *H04N 25/767* (2023.01)

(58) Field of Classification Search
CPC .... H04N 25/135; H04N 25/62; H04N 25/767; H04N 25/76; H04N 23/843;
(Continued)

(56) References Cited

U.S. PATENT DOCUMENTS 7,174,195 B2 2/2007 Nagamine
9,596,398 B2 3/2017 Khawand
(Continued)

FOREIGN PATENT DOCUMENTS

KR 10-2020-0004724 A 1/2020
KR 10-2020-0027328 A 3/2020
(Continued)

OTHER PUBLICATIONS

Horita A; WO2022030367A1 Imaging Device (Year: 2022).*

*Primary Examiner* — Twyler L Haskins
*Assistant Examiner* — Surafel Yilmakassaye
(74) *Attorney, Agent, or Firm* — Morgan, Lewis & Bockius LLP

(57) ABSTRACT

Disclosed is a camera module which includes an image sensor including pixels outputting raw image data based on light incident from at least one of a display or the exterior, and control logic receiving the raw image data and generating image data. In a first operation mode, the control logic turns off calibration of the image sensor, receives first raw image data, which are based on the light incident from the display, from the image sensor, and generates crosstalk calibration data based on first output values included in the first raw image data. In a second operation mode, the control logic turns on the calibration of the image sensor, receives second raw image data, which are based on light incident from the display and the exterior, from the image sensor, and generates the image data based on second output values included in the second raw image data.

17 Claims, 13 Drawing Sheets

(58) Field of Classification Search
CPC ...... H04N 25/134; H04N 23/54; H04N 23/88; H04N 9/646; H04N 9/73; H04N 9/7917; H04N 23/667; H04N 23/951
See application file for complete search history.

(56) References Cited

U.S. PATENT DOCUMENTS

| | | | | |
|---|---|---|---|---|
| 9,762,807 | B1 | 9/2017 | Bonden et al. | |
| 10,551,312 | B2 | 2/2020 | Jang et al. | |
| 11,093,727 | B2 | 8/2021 | Lim et al. | |
| 11,119,075 | B2 | 9/2021 | Park et al. | |
| 11,222,191 | B2 | 1/2022 | Cho | |
| 11,246,494 | B2 | 2/2022 | Cho et al. | |
| 11,375,181 | B2 | 6/2022 | Shin et al. | |
| 11,551,467 | B2 | 1/2023 | Song et al. | |
| 11,579,076 | B2 | 2/2023 | Moon et al. | |
| 2005/0286355 | A1 | 12/2005 | Kim et al. | |
| 2020/0374437 | A1 | 11/2020 | Kang et al. | |
| 2021/0048834 | A1 | 2/2021 | Oh et al. | |
| 2021/0150176 | A1 | 5/2021 | Song et al. | |
| 2021/0266503 | A1* | 8/2021 | Choi | H04N 25/611 |
| 2021/0286866 | A1 | 9/2021 | Jin et al. | |
| 2021/0383555 | A1* | 12/2021 | Shin | H04N 25/134 |
| 2022/0046215 | A1* | 2/2022 | Cha | H04N 23/88 |
| 2022/0107421 | A1 | 4/2022 | Kim et al. | |
| 2022/0331968 | A1 | 10/2022 | Ryu et al. | |
| 2022/0345605 | A1* | 10/2022 | Chuang | G06T 5/92 |
| 2023/0068763 | A1 | 3/2023 | Kwon et al. | |

FOREIGN PATENT DOCUMENTS

| | | | | |
|---|---|---|---|---|
| KR | 10-2020-0039406 | A | 4/2020 | |
| KR | 10-2020-0110860 | A | 9/2020 | |
| KR | 10-2020-0134804 | A | 12/2020 | |
| KR | 10-2021-0017269 | A | 2/2021 | |
| KR | 10-2021-0020325 | A | 2/2021 | |
| KR | 10-2021-0061572 | A | 5/2021 | |
| KR | 10-2021-0132372 | A | 11/2021 | |
| KR | 10-2022-0006869 | A | 1/2022 | |
| KR | 10-2022-0017649 | A | 2/2022 | |
| KR | 10-2022-0039014 | A | 3/2022 | |
| KR | 10-2022-0041750 | A | 4/2022 | |
| KR | 10-2022-0045834 | A | 4/2022 | |
| KR | 10-2022-0063391 | A | 5/2022 | |
| KR | 10-2022-0144746 | A | 10/2022 | |
| KR | 10-2461186 | B1 | 10/2022 | |
| KR | 10-2023-0027555 | A | 2/2023 | |
| WO | WO-2022030367 | A1 * | 2/2022 | H04N 23/88 |

* cited by examiner

Figure 1:
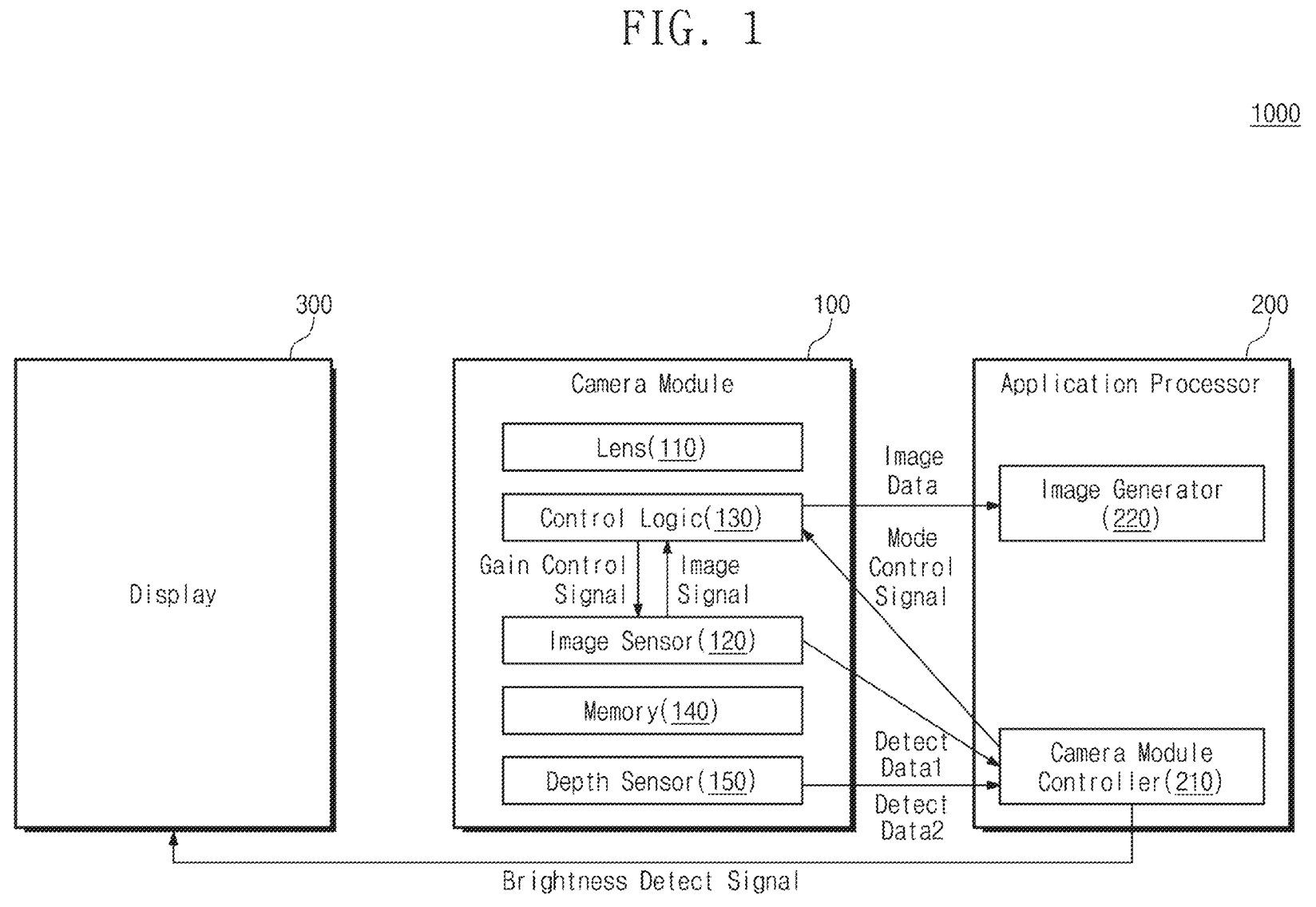

200
Application Processor
Image Generator (220)
Camera Module Controller (210)

Image Data
Mode Control Signal
Detect Data1
Detect Data2

100
Camera Module
Lens (110)
Control Logic (130)
Image Signal
Gain Control Signal
Image Sensor (120)
Memory (140)
Depth Sensor (150)

Brightness Detect Signal

300
Display

R
Gb
Gr
B
Binning Bayer Node
R2
Gb2
R4
Gb4
Gr2
B2
Gr4
B4
R1
Gb1
R3
Gb3
Gr1
B1
Gr3
B3
Remosaic Bayer Mode
L1
s2
s1
s3
s4
Tetra - Bayer Type

FIG. 4A

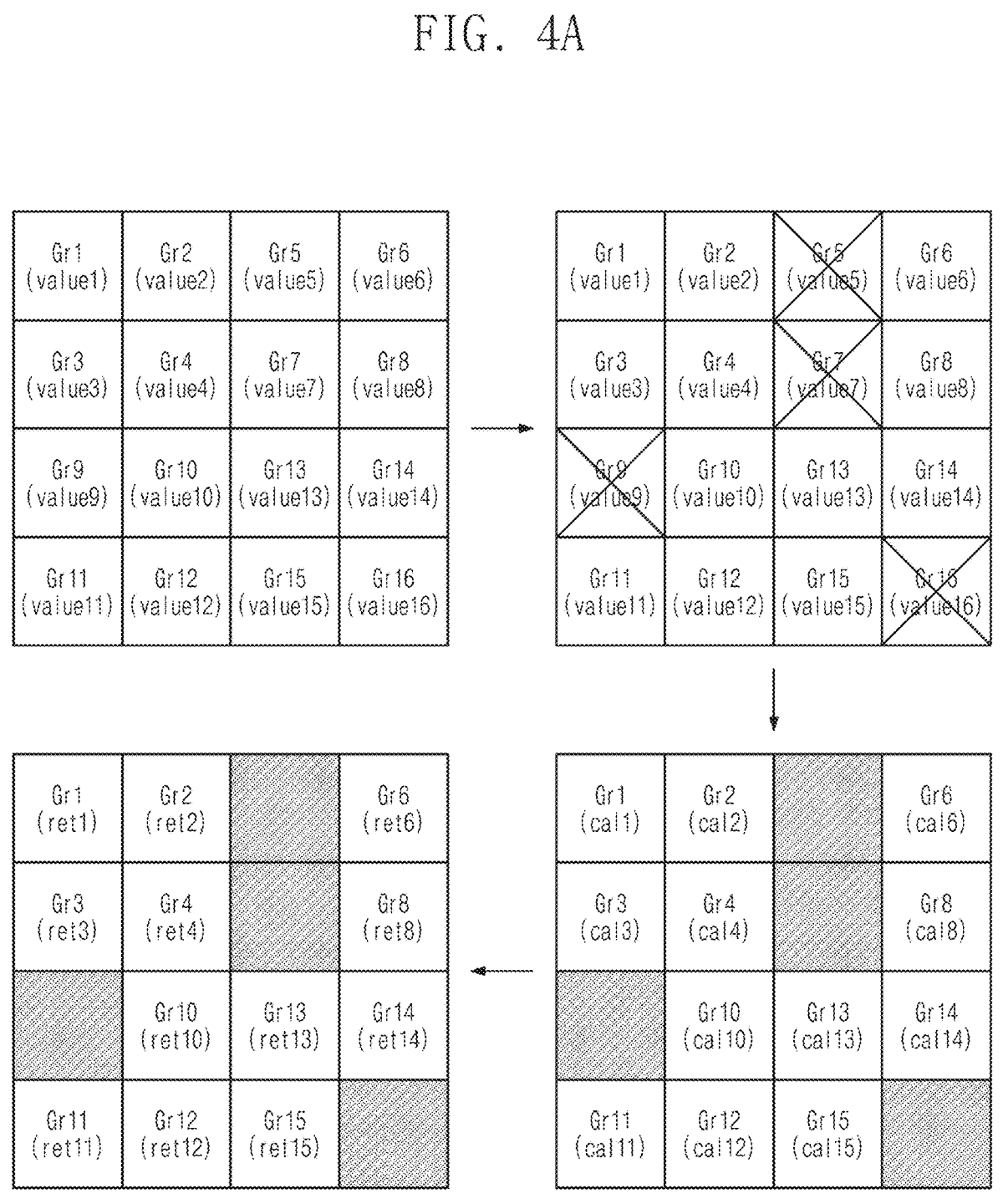

| Gr1 (value1) | Gr2 (value2) | Gr5 (value5) | Gr6 (value6) |
|---|---|---|---|
| Gr3 (value3) | Gr4 (value4) | Gr7 (value7) | Gr8 (value8) |
| Gr9 (value9) | Gr10 (value10) | Gr13 (value13) | Gr14 (value14) |
| Gr11 (value11) | Gr12 (value12) | Gr15 (value15) | Gr16 (value16) |

| Gr1 (value1) | Gr2 (value2) | Gr5 (value5) | Gr6 (value6) |
|---|---|---|---|
| Gr3 (value3) | Gr4 (value4) | Gr7 (value7) | Gr8 (value8) |
| Gr9 (value9) | Gr10 (value10) | Gr13 (value13) | Gr14 (value14) |
| Gr11 (value11) | Gr12 (value12) | Gr15 (value15) | Gr16 (value16) |

| Gr1 (cal1) | Gr2 (cal2) | | Gr6 (cal6) |
|---|---|---|---|
| Gr3 (cal3) | Gr4 (cal4) | | Gr8 (cal8) |
| | Gr10 (cal10) | Gr13 (cal13) | Gr14 (cal14) |
| Gr11 (cal11) | Gr12 (cal12) | Gr15 (cal15) | |

| Gr1 (ret1) | Gr2 (ret2) | | Gr6 (ret6) |
|---|---|---|---|
| Gr3 (ret3) | Gr4 (ret4) | | Gr8 (ret8) |
| | Gr10 (ret10) | Gr13 (ret13) | Gr14 (ret14) |
| Gr11 (ret11) | Gr12 (ret12) | Gr15 (ret15) | |

Figure 5:
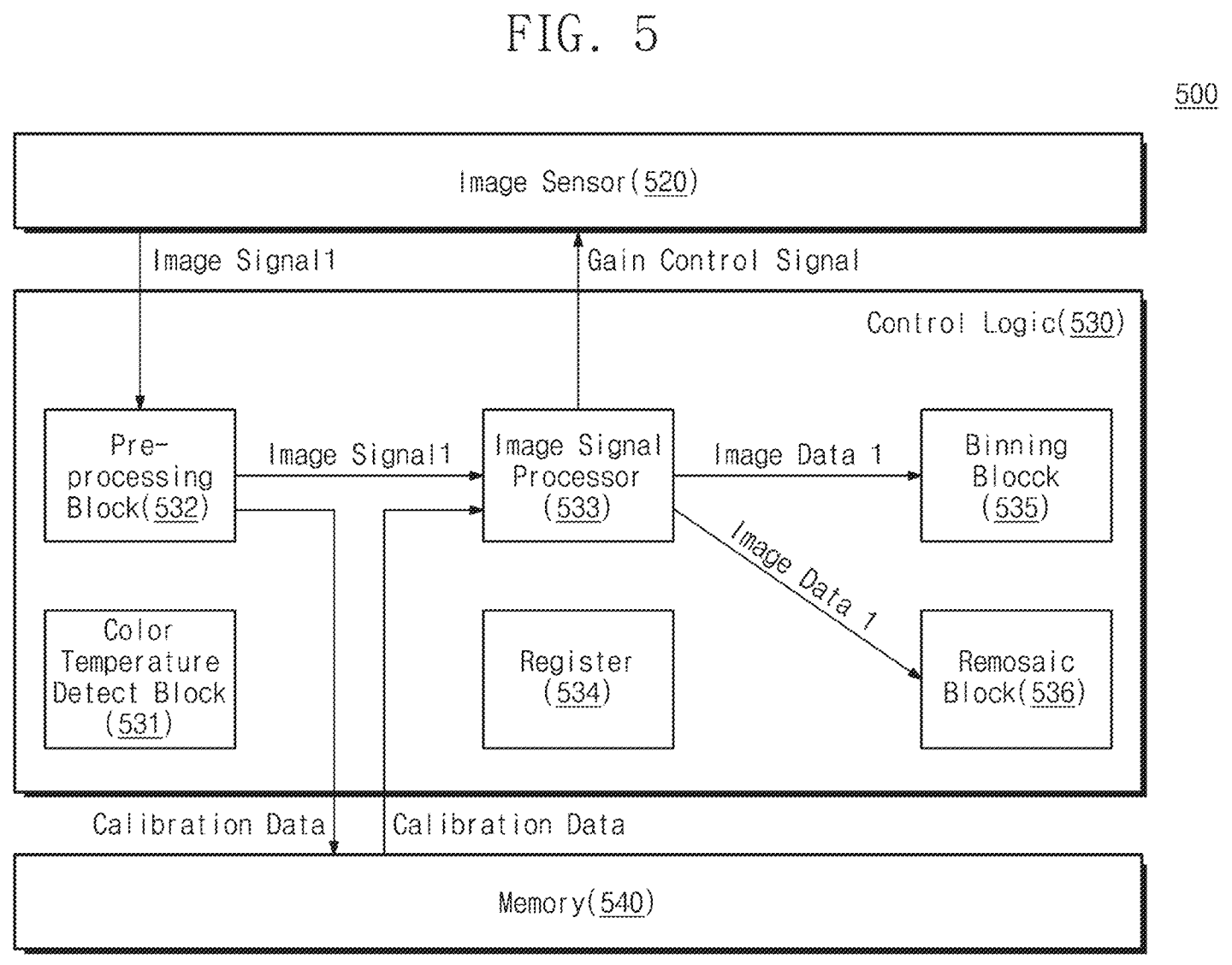

Image Sensor(520)

Image Signal1

Gain Control Signal

Control Logic(530)

Pre-processing Block(532)

Color Temperature Detect Block(531)

Image Signal1

Image Signal Processor(533)

Register(534)

Image Data 1

Image Data 1

Binning Blocck(535)

Remosaic Block(536)

Calibration Data

Calibration Data

Memory(540)

CAMERA MODULE FOR CALIBRATING IMAGE DATA, OPERATING METHOD OF CAMERA MODULE, AND ELECTRONIC DEVICE INCLUDING CAMERA MODULE

CROSS-REFERENCE TO RELATED APPLICATIONS

This application claims priority under 35 U.S.C. § 119 to Korean Patent Application No. 10-2022-0109452 filed on Aug. 30, 2022, in the Korean Intellectual Property Office, the disclosure of which is incorporated by reference herein in its entirety.

BACKGROUND

Embodiments of the present disclosure described herein relate to an image signal processing device, and more particularly, relate to a camera module for performing calibration on image data, an operating method of the camera module, and an electronic device including the camera module.

An image sensor included in a smartphone, a tablet personal computer (PC), a digital camera, etc. converts light reflected from an external object into an electrical signal to obtain image information about the external object. Various image signal processing operations are performed to convert the electrical signal obtained from the image sensor into image information capable of being actually perceived by a person or to improve the quality of such image.

The Tetra sensor, currently a mainstream sensor operates in a binning mode and performs a remosaic process when capturing and storing a full-size image. In the remosaic process, noise may be caused by crosstalk due to the structure of the Tetra sensor. The detrimental effect of noise may be improved through inter-module calibration. However, because the current inter-module calibration is performed only at a color temperature of 5100K, there is a limitation in performing calibration at a color temperature other than a color temperature of 5100K. In this case, it may prove difficult to correct the quality of image.

SUMMARY OF THE INVENTION

Exemplary embodiments of the present disclosure provide a camera module for performing calibration on image data of various color temperatures, which are output through a display, for each color temperature, an operating method of the camera module, and an electronic device including the camera module.

According to an embodiment, a camera module includes an image sensor that includes a plurality of pixels outputting raw image data based on a light incident from at least one of a display or the exterior, and control logic that receives the raw image data and generates image data. In a first operation mode, the control logic turns off calibration of the image sensor, receives first raw image data, which are based on the light incident from the display, from the image sensor, and generates crosstalk calibration data based on first output values included in the first raw image data. In a second operation mode, the control logic turns on the calibration of the image sensor, receives second raw image data, which are based on the light incident from the display and the exterior, from the image sensor, and generates the image data based on second output values included in the second raw image data.

According to another exemplary embodiment, an operating method of a camera module includes outputting raw image data, by an image sensor including a plurality of pixels included in the camera module, and operating in a first operation mode or a second operation mode, by control logic included in the camera module. The operating in the first operation mode includes turning off calibration of the image sensor, receiving first raw image data from the image sensor, and generating crosstalk calibration data based on first output values included in the first raw image data. The operating in the second operation mode includes turning on the calibration of the image sensor, receiving second raw image data from the image sensor, and generating image data based on second output values included in the second raw image data.

According to a further exemplary embodiment, an electronic device includes a camera module, a display through which light is incident onto the camera module, and an application processor that receives image data from the camera module and to output an output image. The camera module includes a memory, a depth sensor that detects a distance from the display and generates a distance value, an image sensor that includes a plurality of pixels outputting raw image data, and control logic that receives the raw image data and generates image data. In a first operation mode, the image sensor outputs first raw image data including first color temperature data based on the light incident from the display. In the first operation mode, the control logic turns off calibration of the image sensor, receives first raw image data from the image sensor, and generates crosstalk calibration data, which are based on first color temperature data, that is based on first output values included in the first raw image data. In a second operation mode, the control logic turns on the calibration of the image sensor, receives second raw image data from the image sensor, and generates the image data based on second output values included in the second raw image data.

BRIEF DESCRIPTION OF THE DRAWINGS

The above and other objects and features of the present disclosure will become apparent by describing in detail exemplary embodiments thereof with reference to the accompanying drawings.

FIG. 1 is a block diagram illustrating an electronic device according to an exemplary embodiment of the present disclosure.

FIG. 4A is a diagram illustrating an exemplary embodiment wherein crosstalk calibration data are generated based on output values of pixels including a first color filter in an image sensor.

FIG. 5 is a diagram illustrating a configuration of control logic having a first operation mode and a second operation mode in a detail.

DETAILED DESCRIPTION

Figure 2A:
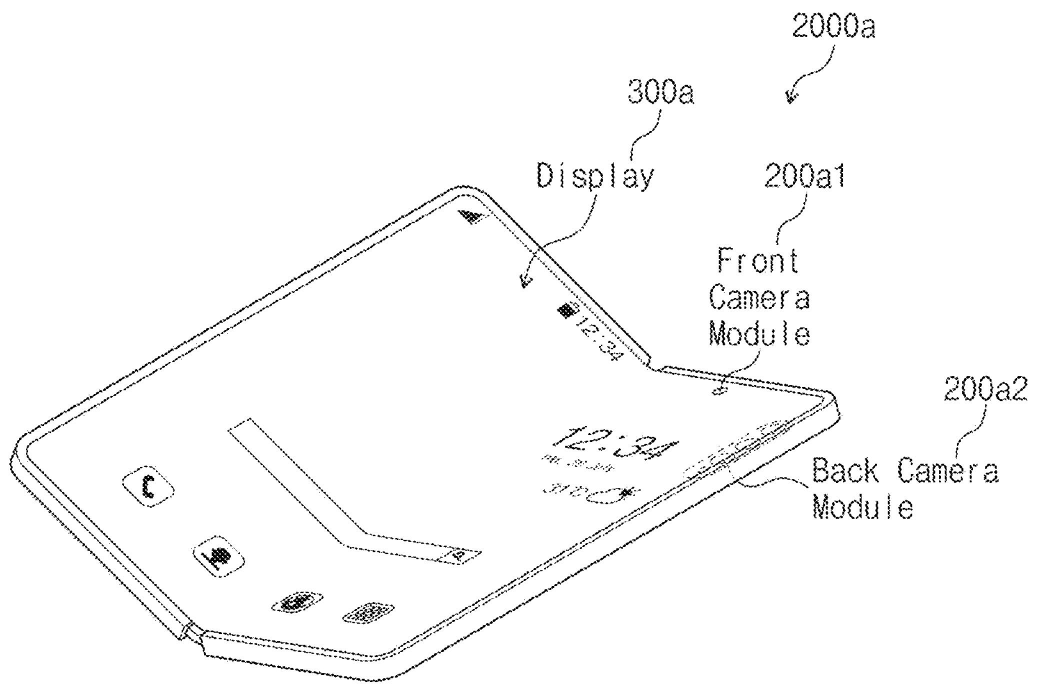
FIG. 2A is a diagram illustrating an exemplary embodiment of an electronic device where a display and a front camera module do not contact each other.

Below, exemplary embodiments of the present disclosure will be described in detail and clearly to such an extent that a person of skill in the art may easily implement the invention.

FIG. 1 is a block diagram illustrating an electronic device 1000 according to an exemplary embodiment of the present disclosure. Referring to FIG. 1, the electronic device 1000 that performs calibration may include a camera module 100, an application processor 200, and a display 300.

Although not illustrated, the camera module 100 may sense light incident from the exterior. The camera module 100 may include a plurality of camera modules. The plurality of camera modules may be in the shape of a circle or a quadrangle. However, the shape of the plurality of camera modules is not limited thereto.

In this disclosure, only camera module 100 being one of the plurality of camera modules will be described. Configurations and functions of the remaining camera modules may be identical to a configuration and a function of the camera module 100 to be described below.

The application processor 200 may receive image data from the camera module 100 and may generate an output image. The application processor 200 may control an overall operation of the camera module 100.

The display 300 may output light having various color temperatures. The camera module 100 may sense light incident from the display 300. The camera module 100 may include a lens 110, an image sensor 120, control logic 130, a memory 140, and a depth sensor 150. The lens 110 may receive light having various color temperatures from the display 300.

The image sensor 120 may include a plurality of image sensors. The plurality of image sensors may include at least one of a charge coupled device (CCD) image sensor and a complementary metal-oxide semiconductor (CMOS) image sensor (CIS).

The CMOS image sensor may include pixels composed of CMOS transistors and may convert light energy into an electrical signal by using a photoelectric conversion element (or device) included in each pixel. The CMOS image sensor may obtain information about a captured/photographed image by using the electrical signal generated by each pixel.

The image sensor 120 may detect the intensity of light incident from the exterior and the intensity of light incident from the display 300. In an exemplary embodiment, the image data may be raw image data that does not experience the image signal processing operation.

The image sensor 120 may detect the intensity of light incident from the exterior and the intensity of light incident from the display 300 and may send a detection result to the application processor 200. How the application processor 200 determines an operation mode of the camera module 100 based on the detection result will be described in detail below.

The image sensor 120 may include a plurality of pixels. Each of the plurality of pixels may be configured to output an electrical signal corresponding to light incident from the exterior. The image sensor 120 may output the image data based on the electrical signal.

The image data that the image sensor 120 outputs may be a set of pixel values that the plurality of pixels output, respectively. The image sensor 120 may output the raw image data as an image signal in a state where the calibration of the camera module 100 is turned off (or disabled).

Depending on the settings of the camera module 100 and the settings of the image sensor 120, the image sensor 120 may output, as the image signal, the raw image data that does not experience the image signal processing operations.

The settings of the camera module 100 may include auto white balance (AWB), high dynamic range (HDR), and manual white balance (MWB) D50 settings. The MWB D50 setting may mean an operation of setting the white balance to a color temperature of 5000K.

The calibration of the camera module 100 may be turned off by disabling the auto white balance (AWB) setting and disabling the high dynamic range (HDR) setting.

The gain of the image sensor 120 may be set to "1" for the purpose of converting light incident onto the lens 110 into an electrical signal without modification; in this case, the raw image data may be output.

Control logic 130 may control the components of the camera module 100 and the overall operations of the camera module 100. To obtain raw image data from the image sensor 120, the control logic 130 may send a gain control signal to the image sensor 120. The gain of the image sensor 120 may be set to "1" based on the gain control signal.

Control logic 130 may allow the camera module 100 to operate in one of a first operation mode where the calibration is turned off and a second operation mode where the calibration is turned on. The first operation mode and the second operation mode will be described in detail below.

In the first operation mode, under control of control logic 130, the camera module 100 may perform an image signal pre-processing operation based on output values included in the raw image data and may generate crosstalk calibration data.

The image signal pre-processing operation may include an operation of generating crosstalk calibration data based on a result of processing the remaining output values other than some of the plurality of output values in the raw image data. How the control logic 130 controls the camera module 100 such that crosstalk calibration data are generated will be described in detail below.

In the second operation mode, under control of control logic 130, the camera module 100 may perform calibration based on crosstalk calibration data. In this case, under control of the control logic 130, the camera module 100 may perform calibration based on first crosstalk calibration data including data of different color temperatures. The different color temperature data may include first to n-th color temperature data.

Alternatively, under control of control logic 130, the camera module 100 may perform calibration based on second crosstalk calibration data different from the first crosstalk calibration data, and the second crosstalk calibration data may be based on one color temperature. How the control logic 130 controls the camera module 100 such that calibration is performed based on the first crosstalk calibration data or the second crosstalk calibration data will be described in detail below.

Memory 140 may be a dynamic random access memory (DRAM), but the present disclosure is not limited thereto. Memory 140 may be one of various random access memories such as s static random access memory (SRAM), a magnetic RAM (MRAM), a phase-change RAM (PRAM), a ferroelectric RAM (FRAM), and a resistive RAM (RRAM).

Memory 140 may temporarily store data that is obtained by performing an image signal pre-processing operation on the raw image data. Memory 140 may temporarily store the crosstalk calibration data including data of different color temperatures. Memory 140 may temporarily store crosstalk calibration data that is based on one color temperature. The memory 140 may temporarily store resultant data after the crosstalk calibration is made.

Below, crosstalk calibration data generated depending on the image signal pre-processing operation is referred to as "second crosstalk calibration data", and crosstalk calibration data that is stored in the memory 140 without the image signal pre-processing operation are referred to as "first crosstalk calibration data".

The depth sensor 150 may detect a distance from the depth sensor 150 to the display 300. The depth sensor 150 may output a distance value detection result to the application processor 200. In this case, the application processor 200 may send a brightness detect signal to the display 300.

How the application processor 200 determines an operation mode of the camera module 100 based on results of detecting the intensity of light and a distance will be described in detail below.

The application processor 200 may include a camera module controller 210 and an image generator 220. The camera module controller 210 may send a module control signal to the control logic 130. The module control signal may be based on a value of the intensity of light detected by the image sensor 120 and a value of the distance detected by the depth sensor 150.

The camera module controller 210 may activate or deactivate the components of the control logic 130 based on the module control signal. The control logic 130 may control operations of the components of the camera module 100 based on the module control signal.

The image generator 220 may receive the image data from the control logic 130. The image data may refer to data that experiences calibration and the image signal processing operation. The image generator 220 may generate the output image based on the image data.

FIG. 2A is a diagram illustrating an exemplary embodiment of an electronic device 2000*a* where a display 300*a* and a front camera module 200*a*1 do not contact each other. In an exemplary embodiment, the display 300*a* and the front camera module 200*a*1 included in the electronic device 2000*a* of FIG. 2A correspond to the display 300 and the camera module 100 of FIG. 1, respectively. Thus, additional description associated with similar components and similar operations will be omitted to avoid redundancy.

The electronic device 2000*a* of FIG. 2A may include a back camera module 200*a*2. The back camera module 200*a*2 may include a plurality of back camera modules. The plurality of back camera modules may be in the shape of a circle or a quadrangle. However, the shape of the plurality of back camera modules is not limited thereto.

In this disclosure, only the back camera module 200*a*2 being one of the plurality of back camera modules will be described. Configurations and functions of the remaining back camera modules may be identical to a configuration and a function of the back camera module 200*a*2 to be described below.

Referring to FIGS. 1 and 2A, the back camera module 200*a*2 may include all or some of the components of the back camera module 200*a*2. Although not illustrated, when the back camera module 200*a*2 is disposed to be in contact with a display (not illustrated) different from the display 300*a*, the back camera module 200*a*2 may perform functions similar to those of the front camera module 200*a*1.

Each of the front camera modules 200*a*1 and the back camera module 200*a*2 may detect the intensity of light incident from the exterior. A value indicating the intensity of light detected by the back camera module 200*a*2 may be provided to the front camera module 200*a*1.

The control logic 130 included in the front camera module 200*a*1 may control the front camera module 200*a*1 based on the value (hereinafter referred to as an "intensity value of light") indicating the intensity of light detected by the front camera module 200*a*1 and the back camera module 200*a*2, so as to operate in one of the first operation mode or the second operation mode.

When the intensity value of the detected light is less than or equal to a threshold value, the control logic 130 may allow the front camera module 200*a*1 to operate in the first operation mode. When the intensity value of the light exceeds the threshold value, the control logic 130 may allow the front camera module 200*a*1 to operate in the second operation mode.

The control logic 130 may control the operation mode of the front camera module 200*a*1 based on the intensity value of the detected light and a value of a distance detected by the depth sensor 150. For example, when the intensity value of the detected light is less than or equal to the threshold value and the value of the detected distance is less than or equal to the threshold value, the control logic 130 may allow the front camera module 200*a*1 to operate in the first operation mode.

When the distance value exceeds the threshold value or the intensity value of the detected light exceeds the threshold value, the control logic 130 may allow the front camera module 200*a*1 to operate in the second operation mode where calibration is performed.

When it is determined that the value indicating the distance between the depth sensor 150 and the display 300*a* detected by the depth sensor 150 exceeds the threshold value, in FIG. 2A, the control logic 130 may allow the front camera module 200*a*1 to operate in the second operation mode where calibration is performed based on the first crosstalk calibration data or the second crosstalk calibration data.

Figure 2B:
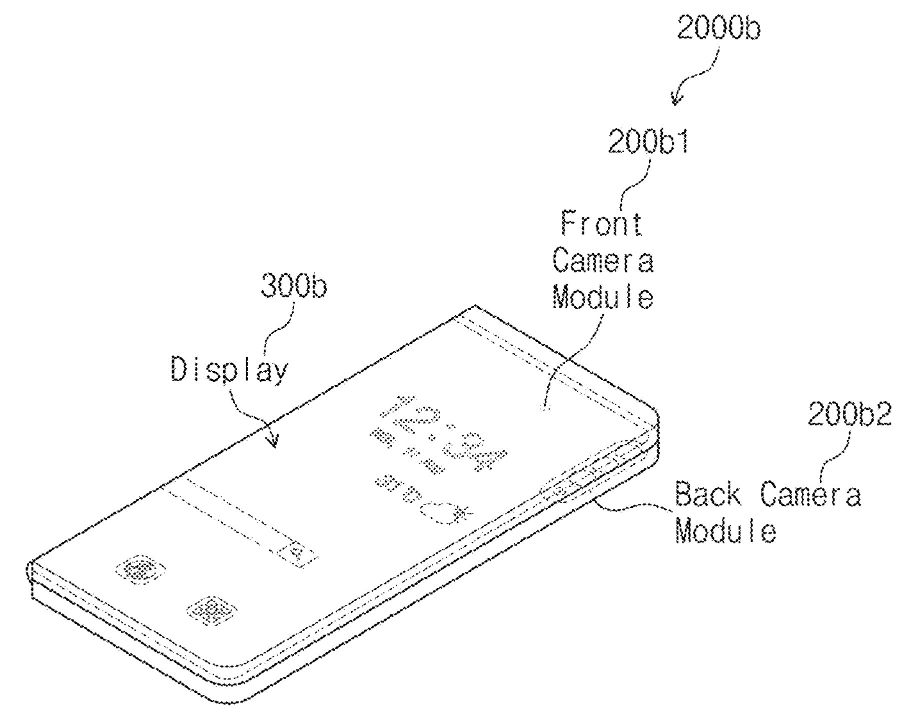
FIG. 2B is a diagram illustrating an exemplary embodiment of an electronic device where a display and a front camera module contact each other.

FIG. 2B is a diagram illustrating an exemplary embodiment of an electronic device 2000*b* where a display 300*b* and a front camera module 200*b*1 contact each other. In an exemplary embodiment, the display 300*b*, the front camera module 200*b*1, and a back camera module 200*b*2 included in the electronic device 2000_b_ of FIG. 2B correspond to the display 300_a_, the front camera module 200_a_1, and the back camera module 200_a_2 included in the electronic device 2000_a_ of FIG. 2A, respectively. Thus, additional description associated with similar components and similar operations will be omitted to avoid redundancy.

In FIG. 2B, the front camera module 200_b_1 may be disposed at the same location as the front camera module 200_a_1 of FIG. 2A. In this case, the front camera module 200_b_1 may engage with the display 300_b_ in the structure.

Referring to FIGS. 1 and 2B, when a value indicating the intensity of light detected by each of the front camera module 200_b_1 and the back camera module 200_b_2 is less than or equal to a threshold value and when a value indicating the distance between the depth sensor 150 and the display 300_b_ detected by the depth sensor 150 is less than or equal to the threshold value, the control logic 130 may allow the front camera module 200_b_1 to operate in the first operation mode in which the second crosstalk calibration data including data of different color temperatures is generated.

Figure 3:
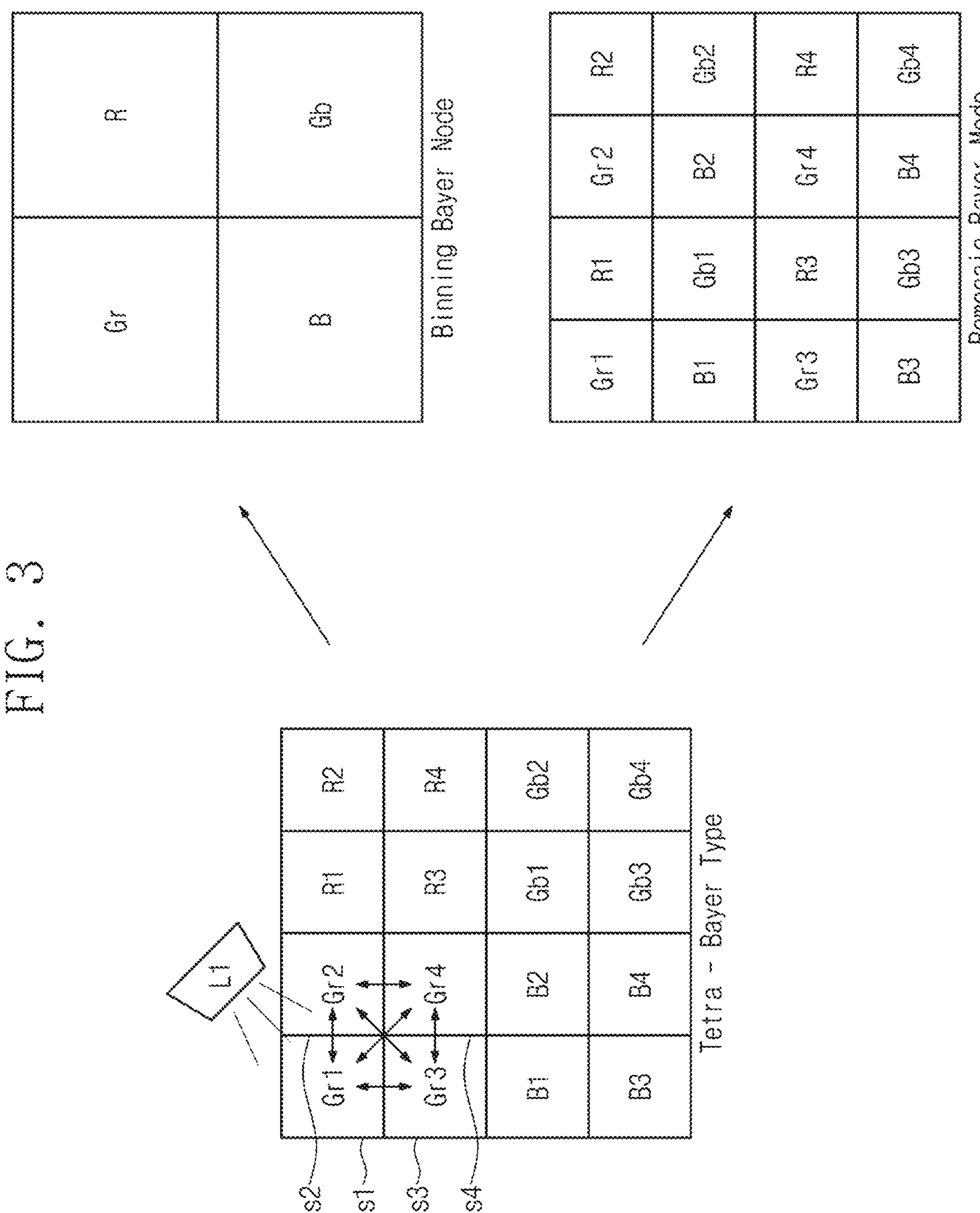
FIG. 3 is a diagram illustrating a first type to a third type associated with image data

FIG. 3 is a diagram illustrating a first type to a third type associated with image data. In an exemplary embodiment, in FIG. 3, in the first type being a Tetra-Bayer type, pixel data that are output from pixels having the same color filters are arranged in a matrix of dimension 2×2. However, the present disclosure is not limited thereto. For example, pixel data of the Tetra-Bayer type may be arranged in a matrix of dimension n×n (n being a natural number of 3 or more).

For example, a first color filter may be a green (Gr) filter, and Gr1 pixel data may be placed adjacent to Gr2 pixel data and Gr3 pixel data. The Gr2 pixel data may be placed adjacent to the Gr1 pixel data and Gr4 pixel data. The Gr3 pixel data may be placed adjacent to the Gr1 pixel data and the Gr4 pixel data. The Gr4 pixel data may be placed adjacent to the Gr2 pixel data and the Gr3 pixel data.

For example, a second color filter may be a red (R) filter, and R1 pixel data may be placed adjacent to R2 pixel data and R3 pixel data. The R2 pixel data may be placed adjacent to the R1 pixel data and R4 pixel data. The R3 pixel data may be placed adjacent to the R1 pixel data and the R4 pixel data. The R4 pixel data may be placed adjacent to the R2 pixel data and the R3 pixel data.

For example, a third color filter may be a blue (B) filter, and B1 pixel data may be placed adjacent to B2 pixel data and B3 pixel data. The B2 pixel data may be placed adjacent to the B1 pixel data and B4 pixel data. The B3 pixel data may be placed adjacent to the B1 pixel data and the B4 pixel data. The B4 pixel data may be placed adjacent to the B2 pixel data and the B3 pixel data.

For example, a fourth color filter may be a green (Gb) filter, and Gb1 pixel data may be placed adjacent to Gb2 pixel data and Gb3 pixel data. The Gb2 pixel data may be placed adjacent to the Gb1 pixel data and Gb4 pixel data. The Gb3 pixel data may be placed adjacent to the Gb1 pixel data and the Gb4 pixel data. The Gb4 pixel data may be placed adjacent to the Gb2 pixel data and the Gb3 pixel data.

Referring to FIGS. 1 and 3, the Gr1 to Gr4 pixel data may correspond to image signals s1 to s4 that are output based on light L1 incident onto Gr1 to Gr4 pixels each having the Gr filter. In a binning Bayer mode, the Gr Bayer may have an average value of output values output from the Gr1 to Gr4 pixels.

Likewise, in the case of pixels having the R filter, the B filter, and the Gb filter, in the binning Bayer mode, the R Bayer may have an average value of output values output from R1 to R4 pixels, the B Bayer may have an average value of output values output from B1 to B4 pixels, and the Gb Bayer may have an average value of output values output from Gb1 to Gb4 pixels.

Alternatively, because crosstalk occurs between the Gr1 to Gr4 pixels, in a remosaic Bayer mode, pieces of pixel data may be rearranged (or changed). In this case, the Gr1 to Gr4 pixels may respectively output Gr1, R1, B1, and Gb1 pixel data.

Because crosstalk occurs between the R1 to R4 pixels, in the remosaic Bayer mode, segments of pixel data may be rearranged. In this case, the R1 to R4 pixels may respectively output Gr2, R2, B2, and Gb2 pixel data.

Because crosstalk occurs between the B1 to B4 pixels, in the remosaic Bayer mode, segments of pixel data may be rearranged. In this case, the B1 to B4 pixels may respectively output Gr3, R3, B3, and Gb3 pixel data.

Because crosstalk occurs between the Gb1 to Gb4 pixels, in the remosaic Bayer mode, segments of pixel data may be rearranged. In this case, the Gb1 to Gb4 pixels may respectively output Gr4, R4, B4, Gb4 pixel data.

In the second operation mode, depending on the illuminance of light incident onto the display 300, the control logic 130 may perform one of a remosaic operation or a binning operation on the image data.

For example, when the illuminance of light incident through the display 300 is low, the control logic 130 may perform binning on pixels having the same color filter and may output image data of the binning Bayer type.

For example, when the illuminance of light incident through the display 300 is high, the control logic 130 may perform remosaicing on pixels having the same color filter and may output image data of the remosaic Bayer type.

The image data of the remosaic Bayer type may include pixel data of pixels having the first color filter. However, the pixel data may be data that does not experience crosstalk calibration; in this case, output values corresponding to the pixels having the first color filter from among the image data of the Tetra-Bayer type may not be accurately applied thereto.

Likewise, the image data of the remosaic Bayer type may include pixel data of the pixels having the second to fourth color filters, but output values corresponding to the pixels having the second to fourth color filters from among the image data of the Tetra-Bayer type may not be accurately applied thereto. In this case, the quality of image may be distorted when the output image is generated based on the image data.

Accordingly, below, a configuration for generating crosstalk calibration data based on output values included in the image data to reduce the distortion of the image quality and to improve such image quality will be described in detail.

FIG. 4A is a diagram illustrating an exemplary embodiment wherein crosstalk calibration data is generated based on output values of pixels including a first color filter in an image sensor. In an exemplary embodiment, in FIG. 4A, pixels are arranged in a matrix of dimension 4×4 in the Tetra-Bayer type. However, the present disclosure is not limited thereto. For example, pixels may be arranged in a matrix of dimension n×n in the Tetra-Bayer type.

Referring to FIGS. 1 and 4A, Gr1 to Gr16 pixels that are arranged in a 4×4-matrix may have first to sixteenth values as a result of the crosstalk that occurs between pixels. The first to sixteenth values may be output as arbitrary different values depending on the intensity of light, an incident angle, a process of manufacturing pixel elements, and a degree of crosstalk.

The control logic 130 may perform a first operation based on first to sixteenth code values respectively corresponding to the first to sixteenth values from previously stored codes respectively corresponding to the output values of the image sensor 120.

The first operation may refer to an operation of calculating ratios of the first to sixteenth values for each of the first to sixteenth code values. As a result of the first operation, 16 first ratio values may be generated for each of the first to sixteenth code values.

A second operation may refer to an operation of counting the number of values belonging to (or satisfying) an error range from the first ratio values generated as a result of the first operation for each of the first to sixteenth code values.

For example, the control logic 130 may count the number of values having a first ratio, which is 0.7 or more and 1.3 or less with respect to the first code value, from the ratios of the first to sixteenth values. Likewise, the control logic 130 may count the number of values having the first ratio being 0.7 or more and 1.3 or less with respect to the second to sixteenth code values. However, the present disclosure is not limited thereto. For example, an error range of 30% may be modified to be higher or lower than 30%.

The control logic 130 may select, as a reference value, a code value having the greatest count value from among the first to sixteenth code values. Below, description will be made under the assumption that the first code value is the reference value.

The control logic 130 may generate pre-processed image data based on values, which have the first ratio being 0.7 or more and 1.3 or less with respect to the reference value, from among the first to sixteenth values.

For example, in FIG. 4A, ratios of a fifth value, a seventh value, a ninth value, and a sixteenth value that are respectively output from a Gr5 pixel, a Gr7 pixel, a Gr9 pixel, and a Gr16 pixel may be less than 0.7 or may exceed 1.3 with respect to the reference value; in this case, the pre-processed image data may be generated by excluding the fifth value, the seventh value, the ninth value, and the sixteenth value.

The control logic 130 may generate crosstalk calibration data based on the values included in the pre-processed image data. The crosstalk calibration data may include a ratio value indicating a difference between an average value of the values included in the pre-processed image data and each of the values included in the pre-processed image data.

The control logic 130 may generate result values by applying crosstalk calibration data to the values included in the pre-processed image data. For example, there may be generated first to fourth result values, a sixth result value, an eighth result value, and tenth to fifteenth result values that are respectively associated with Gr1 to Gr4 pixels, a Gr6 pixel, a Gr8 pixel, Gr10 to Gr15 pixels. The control logic 130 may perform a third operation based on the generated result values and the first code value being that is a reference value. The third operation may refer to an operation of calculating error values of the generated result values with respect to the first code value. As a result of the third operation, 12 error values may be generated.

For example, the control logic 130 may count the number of result values having an error value being −3% or more and 3% or less from among the generated result values. However, the present disclosure is not limited thereto. For example, the error range of 3% may be modified to be higher or lower than 3%.

When a second ratio of the number of result values having an error value within an error value range of 3% to the number of the generated result values is 99% or more, the crosstalk calibration data may be stored in the memory 140 under control of the control logic 130.

Figure 4B:
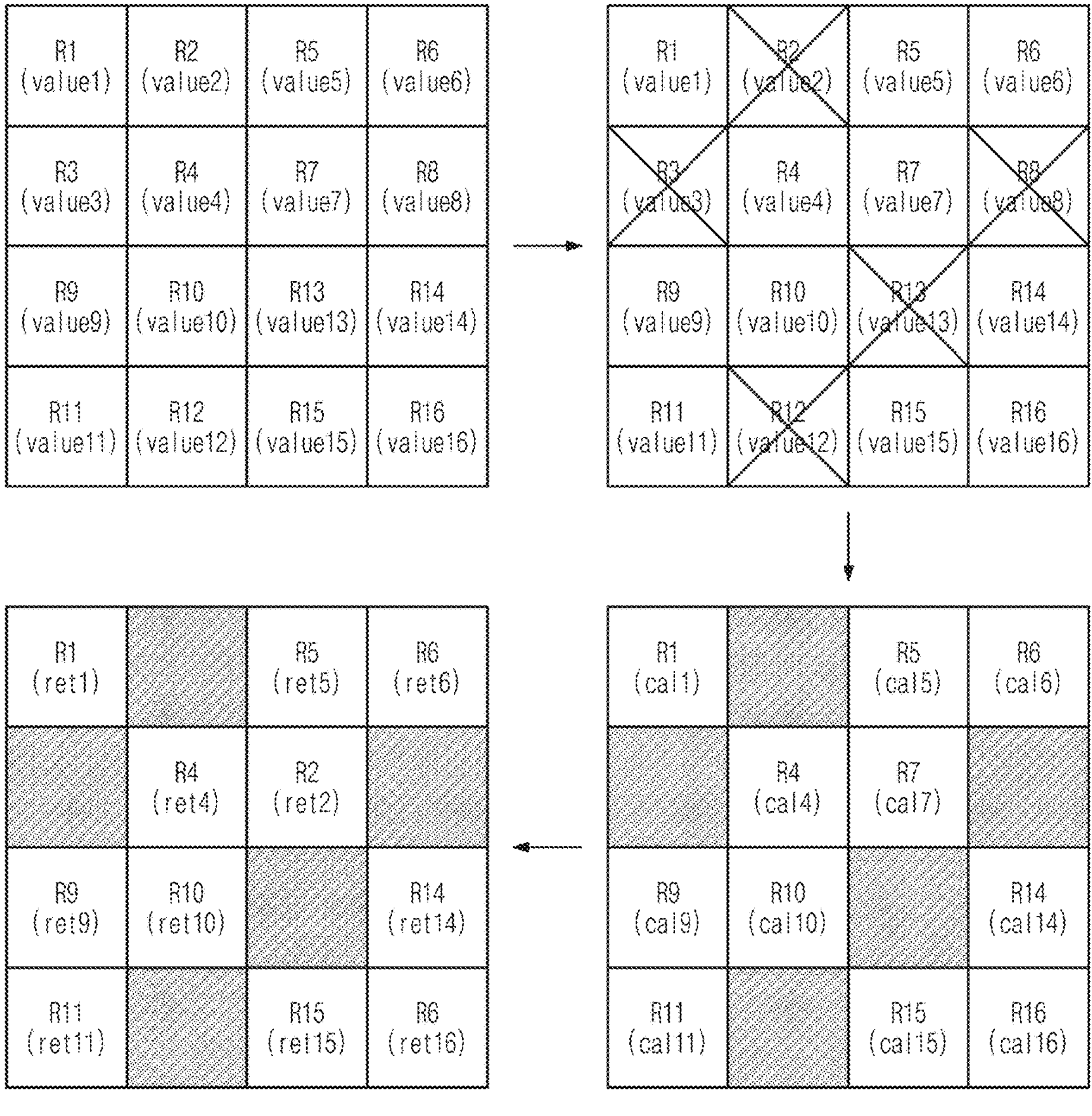
FIG. 4B is a diagram illustrating an exemplary embodiment wherein crosstalk calibration data are generated based on output values of pixels including a second color filter in an image sensor.

FIG. 4B is a diagram illustrating an exemplary embodiment wherein crosstalk calibration data is generated based on output values of pixels including a second color filter in an image sensor. Thus, additional description associated with similar components and similar operations will be omitted to avoid redundancy. Referring to FIGS. 1 and 4B, ratios of a second value, a third value, an eighth value, a twelfth value, and a thirteenth value that are respectively output from an R2 pixel, an R3 pixel, an R8 pixel, an R12 pixel, and an R13 pixel may be less than 0.7 or may exceed 1.3 with respect to the reference value; in this case, the pre-processed image data may be generated by excluding the second value, the third value, the eighth value, the twelfth value, and the thirteenth value.

The control logic 130 may generate result values by applying the crosstalk calibration data to the values included in the pre-processed image data. For example, there may be generated a first result value, fourth to seventh result values, ninth to eleventh result values, and fourteenth to sixteenth result values that are respectively associated with an R1 pixel, R4 to R7 pixels, R9 to R11 pixels, and R14 to R16 pixels.

The control logic 130 may perform the third operation based on the generated result values and the first code value being that is a reference value. As a result of the third operation, 11 error values may be generated.

Figure 4C:
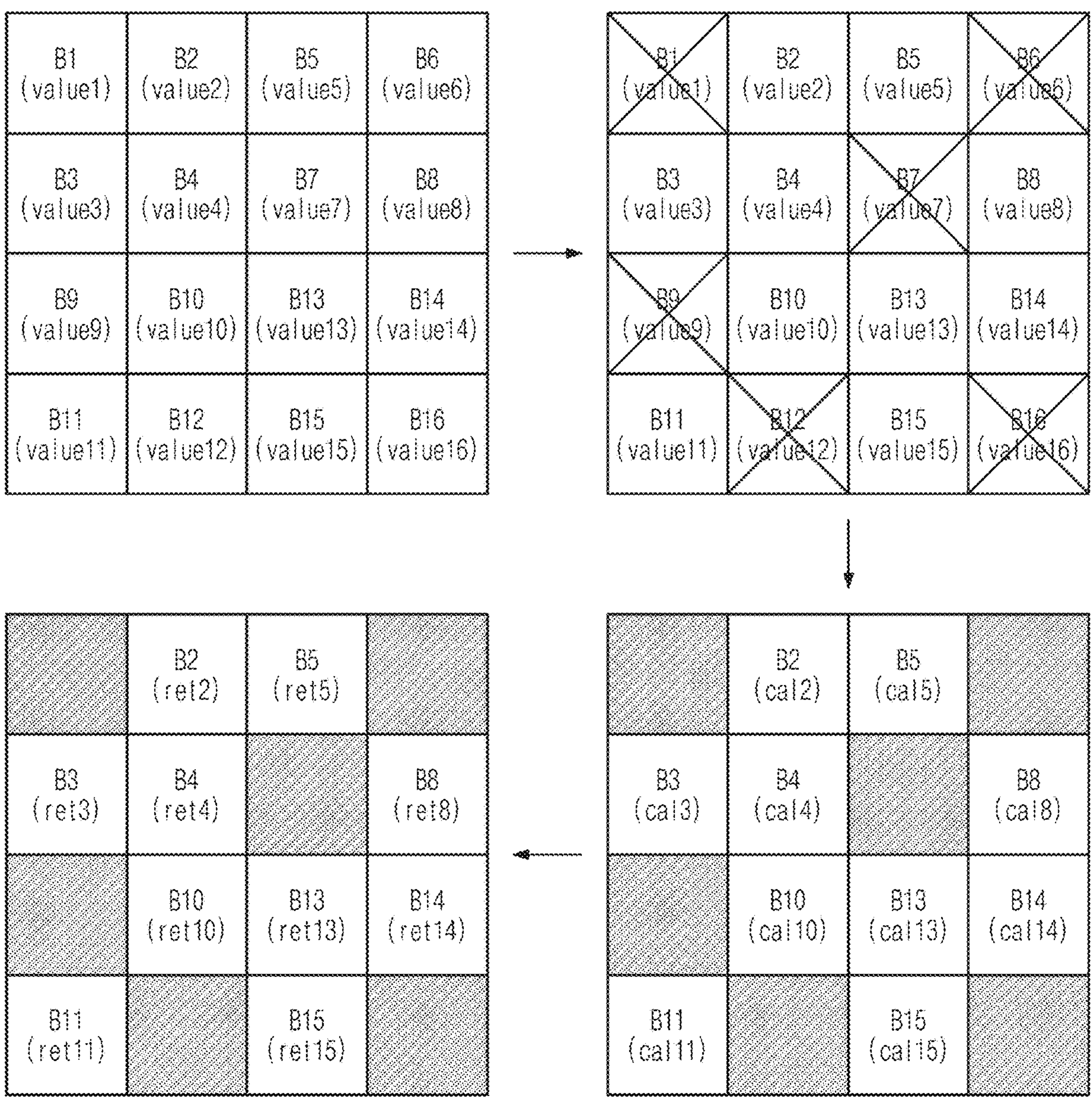
FIG. 4C is a diagram illustrating an exemplary embodiment wherein crosstalk calibration data are generated based on output values of pixels including a third color filter in an image sensor.

FIG. 4C is a diagram illustrating an exemplary embodiment wherein crosstalk calibration data are generated based on output values of pixels including a third color filter in an image sensor. Thus, additional description associated with similar components and similar operations will be omitted to avoid redundancy.

Referring to FIGS. 1 and 4C, ratios of a first value, a sixth value, a seventh value, a ninth value, a twelfth value, and a sixteenth value that are respectively output from a B1 pixel, a B6 pixel, a B7 pixel, a B9 pixel, a B12, and a B16 pixel may be less than 0.7 or may exceed 1.3 with respect to a reference value; in this case, the pre-processed image data may be generated by excluding the first value, the sixth value, the seventh value, the ninth value, the twelfth value, and the sixteenth value.

The control logic 130 may generate result values by applying the crosstalk calibration data to the values included in the pre-processed image data. For example, there may be generated second to fifth result values, an eighth result value, a tenth result value, an eleventh result value, and thirteenth to fifteenth result values that are respectively associated with B2 to B5 pixels, a B8 pixel, a B10 pixel, a B11 pixel, and B13 to B15 pixels.

The control logic 130 may perform the third operation based on the generated result values and the first code value being a reference value. As a result of the third operation, 10 error values may be generated.

Figure 4D:
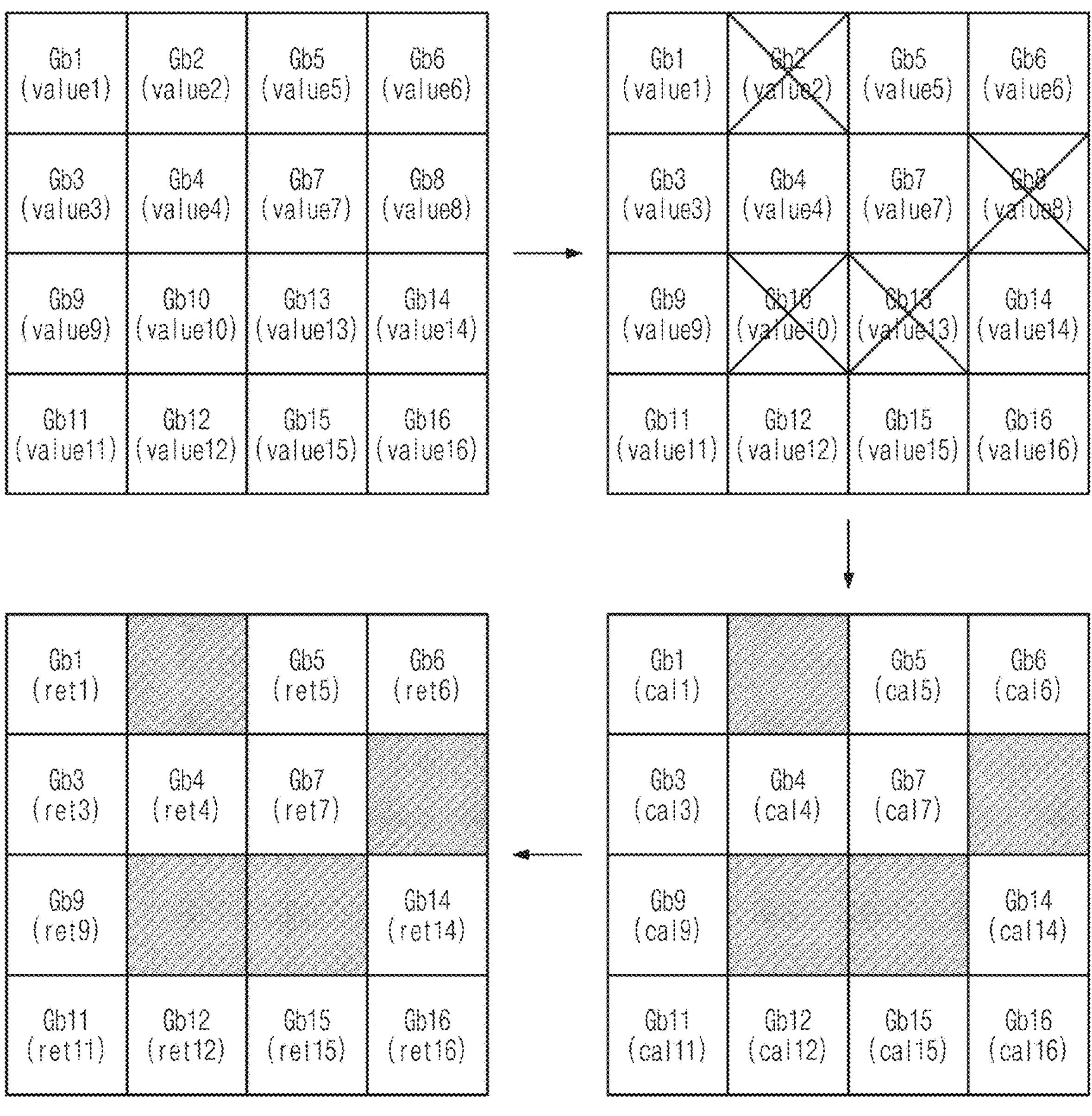
FIG. 4D is a diagram illustrating an exemplary embodiment wherein crosstalk calibration data are generated based on output values of pixels including a fourth color filter in an image sensor.

FIG. 4D is a diagram illustrating an exemplary embodiment wherein crosstalk calibration data are generated based on output values of pixels including a fourth color filter in an image sensor. Thus, additional description associated with similar components and similar operations will be omitted to avoid redundancy.

Referring to FIGS. 1 and 4D, ratios of a second value, an eighth value, a tenth value, and a thirteenth value that are respectively output from a Gb2 pixel, a Gb8 pixel, a Gb10 pixel, a Gb13 pixel may be less than 0.7 or may exceed 1.3 with respect to a reference value; in this case, the pre-processed image data may be generated by excluding the second value, the eighth value, the tenth value, and the thirteenth value.

The control logic 130 may generate result values by applying the crosstalk calibration data to the values included in the pre-processed image data. For example, there may be generated a first result value, third to seventh result values, a ninth result value, an eleventh result value, a twelfth result value, and fourteenth to sixteenth result values that are respectively associated with a Gb1 pixel, Gb3 to Gb7 pixels, a Gb9 pixel, a Gb11 pixel, a Gb12 pixel, and Gb14 to Gb16 pixels.

The control logic 130 may perform the third operation based on the generated result values and the first code value being a reference value. As a result of the third operation, 12 error values may be generated.

In FIGS. 4A to 4D, the control logic 130 may generate result values by calculating the output values of the pixels having the first to fourth color filters; when the second ratio of the number of result values having an error value within the error value range of 3% to the number of result values thus generated is 99% or more for each color filter, the crosstalk calibration data may be stored in the memory 140 under control of the control logic 130.

In FIGS. 4A to 4D, the crosstalk calibration data may correspond to the second crosstalk calibration data generated as a result of the image signal pre-processing operation of FIG. 1.

FIG. 5 is a diagram illustrating a configuration of control logic having a first operation mode and a second operation mode in a camera module 500 in detail. In an exemplary embodiment, an image sensor 520, control logic 530, and a memory 540 of FIG. 5 respectively correspond to the image sensor 120, the control logic 130, and the memory 140 of FIG. 1. Thus, additional description associated with similar components and similar operations will be omitted to avoid redundancy.

The control logic 530 may include a color temperature detect block 531, a pre-processing block 532, an image signal processor 533, a register 534, a binning block 535, and a remosaic block 536.

Referring to FIGS. 1, 4A to 4D, and 5, the color temperature detect block 531 may detect a first color temperature data included in a first image signal received from the image sensor 520. However, the present disclosure is not limited thereto. For example, the color temperature detect block 531 may further detect second to n-th color temperature data included in a plurality of image signals received from the image sensor 520.

For example, although not illustrated, the color temperature detect block 531 may detect the second color temperature data included in the second image signal received from the image sensor 520. The color temperature detect block 531 may detect the third color temperature data included in the third image signal received from the image sensor 520.

In the first operation mode, the pre-processing block 532 may perform the first to third operations based on output values included in each of the plurality of image signals including data of different color temperatures received from the image sensor 520.

The pre-processing block 532 may perform the first to third operations and may determine whether to send the crosstalk calibration data to the memory 540. The first to third operations are described in detail with reference to FIGS. 4A to 4D, and thus, additional description will be omitted to avoid redundancy.

In the second operation mode, the pre-processing block 532 may send the plurality of image signals including data of different color temperatures received from the image sensor 520 to the image signal processor 533 without modification.

In the second operation mode, the image signal processor 533 may perform calibration based on the crosstalk calibration data stored in memory 540 and the output values of the image signal received from the image sensor 520 through the pre-processing block 532. In this case, the crosstalk calibration data stored in the memory 540 may be one of the first crosstalk calibration data or the second crosstalk calibration data.

The first crosstalk calibration data may be data stored in advance in the memory 540. The first crosstalk calibration data may be data generated based on output values of image data having a specific color temperature, for example, a color temperature of 5000K.

The second crosstalk calibration data may be data generated based on output values included in the pre-processed image data obtained by performing the first operation and the second operation on the first to fourth color filters as described with reference to FIGS. 4A to 4D.

The image signal processor 533 may perform image signal processing on data that experience the calibration in the second operation mode. The image signal processor 533 may perform the following image signal processing operations on the calibrated data: color correction, color interpolation, and bad pixel correction.

The register 534 may be configured to store code values corresponding to the output values of the image signal received from the image sensor 520. When the first image signal is received from the image sensor 520, the pre-processing block 532 may fetch the code values corresponding to the output values of the first image signal from register 534.

The binning block 535 may perform binning based on first image data (i.e., data experiencing the image signal processing) output from the image signal processor 533. Although not illustrated, the binning block 535 may perform binning for each of the second to n-th image data (i.e., data experiencing the image signal processing) output from the image signal processor 533.

The remosaic block 536 may perform remosaicing based on the first image data (i.e., data experiencing the image signal processing) output from the image signal processor 533. Although not illustrated, the remosaic block 536 may perform remosaicing for each of the second to n-th image data (i.e., data experiencing the image signal processing) output from the image signal processor 533.

A configuration for performing the binning or the remosaicing is identical to that described with reference to FIG. 3, and thus, additional description will be omitted to avoid redundancy.

Figure 6:
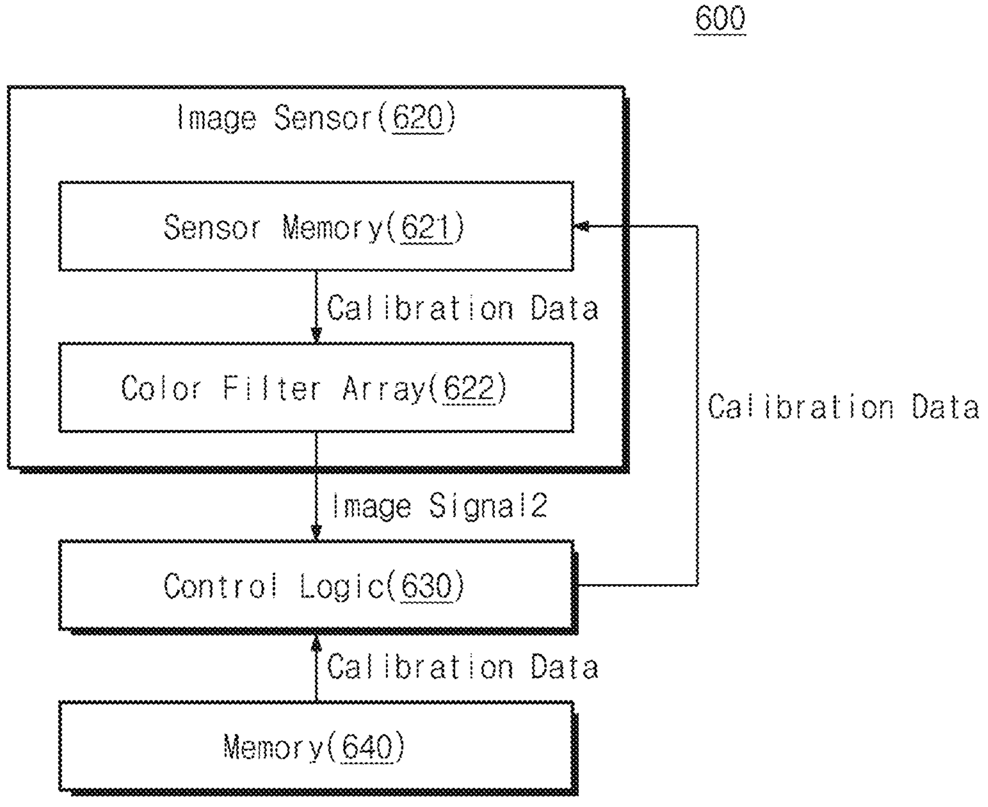
FIG. 6 is a diagram illustrating an exemplary embodiment where an image sensor directly calibrates crosstalk.

FIG. 6 is a diagram illustrating an exemplary embodiment where an image sensor 620 directly calibrates crosstalk.

In FIG. 6, the image sensor 620 may include a sensor memory 621 and a color filter array 622.

Referring to FIGS. 1 to 6, the sensor memory 621 may be configured to receive and store the crosstalk calibration data from control logic 630. The crosstalk calibration data may be one of the first crosstalk calibration data or the second crosstalk calibration data as described with reference to FIG. 5.

The color filter array 622 may include the first to fourth color filters. A plurality of pixels included in the image sensor 620 may include one of the first to fourth color filters.

The plurality of pixels each including one color filter may receive one of the first crosstalk calibration data or the second crosstalk calibration data from the sensor memory 621 and may calibrate the crosstalk.

The plurality of pixels may generate electrical signals from light incident from the exterior and may calibrate the crosstalk by applying the first crosstalk calibration data to output values of the electrical signals.

When the intensity of light incident from the exterior is less than or equal to a threshold value, the plurality of pixels may generate electrical signals from light output through the display 300 and may calibrate the crosstalk by applying the second crosstalk calibration data to output values of the electrical signals.

The image sensor 620 may output the crosstalk-calibrated image data as a second image signal to the control logic 630. Afterwards, the control logic 630 may perform the image signal processing operation on the second image signal received from the image sensor 620. The control logic 630 may perform remosaicing or binning based on the image data experiencing the image signal processing.

Figure 7:
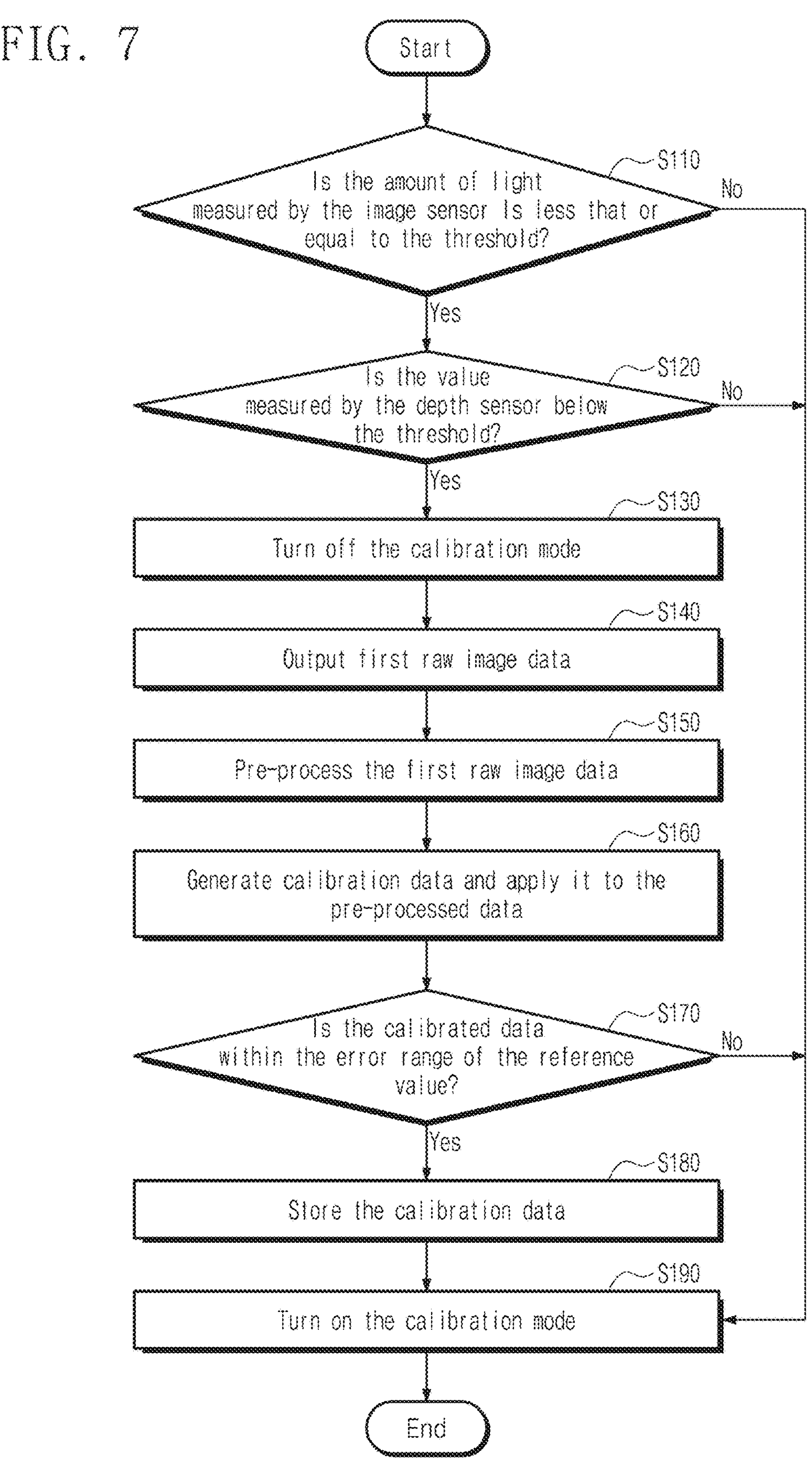
FIG. 7 is a flowchart illustrating an operating method where a camera module operates in a first operation mode, according to an exemplary embodiment of the present disclosure.

FIG. 7 is a flowchart illustrating an operating method where a camera module operates in a first operation mode, according to an exemplary embodiment of the present disclosure.

Referring to FIGS. 1, 5, and 7, in operation S110, the image sensor 120 may detect the intensity of light incident from the exterior. The image sensor 120 may send a value indicating the detected light intensity to the application processor 200. The application processor 200 may determine whether the value indicating the detected light intensity is less than or equal to a threshold value.

In operation S120, the depth sensor 150 may detect a distance from the depth sensor 150 to the display 300. The depth sensor 150 may send a value indicating the detected distance to the application processor 200. The application processor 200 may determine whether the value indicating the detected distance is less than or equal to a threshold value.

When the distance value exceeds the threshold value or the light intensity value exceeds the threshold value, the application processor 200 may send a module control signal to the control logic 130. In this case, the procedure may proceed to operation S190 in which the camera module 100 operates in the second operation mode under control of the control logic 130 such that calibration is performed.

When the distance value is less than or equal to the threshold value and the light intensity value is less than or equal to the threshold value, the application processor 200 may send the module control signal to the control logic 130. In this case, the procedure may proceed to operation S130 to operation S170 step by step, in which the camera module 100 operates in the first operation mode under control of the control logic 130 such that crosstalk calibration data are generated.

In operation S130, a calibration mode may be turned off (or disabled). To turn off the calibration mode may include disabling the auto white balance (AWB) to obtain raw image data from the image sensor 120 and disabling the high dynamic range (HDR).

In operation S140, the color temperature detect block 531 may receive first raw image data from the image sensor 120. The first raw image data may include first color temperature data. The color temperature detect block 531 may detect the first color temperature data.

In operation S150, the pre-processing block 532 may perform a pre-processing operation on the first raw image data. The pre-processing operation may include performing the first operation and the second operation on the first to fourth color filters as described with reference to FIGS. 4A to 4D.

In operation S160, the pre-processing block 532 may generate crosstalk calibration data based on the pre-processed image data generated as a result of the first operation and the second operation and may apply the crosstalk calibration data to the pre-processed image data.

The crosstalk calibration data may include a ratio value indicating a difference between an average value of the values included in the pre-processed image data and each of the values included in the pre-processed image data. The pre-processing block 532 may generate result values by applying the crosstalk calibration data to the values included in the pre-processed image data.

In operation S170, the pre-processing block block 532 may perform the third operation based on the generated result values and a first code value of a reference value. The third operation may refer to an operation of calculating error values of the generated result values with respect to the first code value.

The pre-processing block 532 may count the number of result values having an error value being −3% or more and 3% or less from among the generated result values. However, the present disclosure is not limited thereto. For example, the error range of 3% may be modified to be higher or lower than 3%.

When the second ratio of the number of result values having an error value within the error value range of 3% to the number of result values generated by the pre-processing block 532 is 99% or more, there may be performed operation S180 in which the pre-processing block 532 sends the crosstalk calibration data to the memory 140.

When the second ratio of the number of result values having an error value within the error value range of 3% to the number of result values generated by the pre-processing block 532 is 99% or less, there may be performed operation S190 in which the image signal processor 533 performs calibration on the raw image data based on the first crosstalk calibration data of one color temperature stored in advance.

In operation S180, the memory 140 may store the second crosstalk calibration data. In this case, the first crosstalk calibration data stored in advance may be erased from the memory 140 and may be replaced with the second crosstalk calibration data.

In operation S190, the calibration mode may be turned on. To turn on the calibration mode may include turning on (or enabling) the auto white balance (AWB) and the high dynamic range (HDR) of the camera module 100.

The image signal processor 533 may calibrate the second raw image data received from the image sensor 120 based on the calibration data stored in the memory 140.

When it is determined in operation S170 that the second ratio of the number of result values having an error value within the error value range of 3% is 99% or less, the image signal processor 533 may calibrate the second raw image data based on the first crosstalk calibration data.

When it is determined in operation S170 that the second ratio of the number of result values having an error value within the error value range of 3% is 99% or more, the image signal processor 533 may calibrate the second raw image data based on the second crosstalk calibration data. The second crosstalk calibration data may be data that include different values of different color temperatures.

Figure 8:
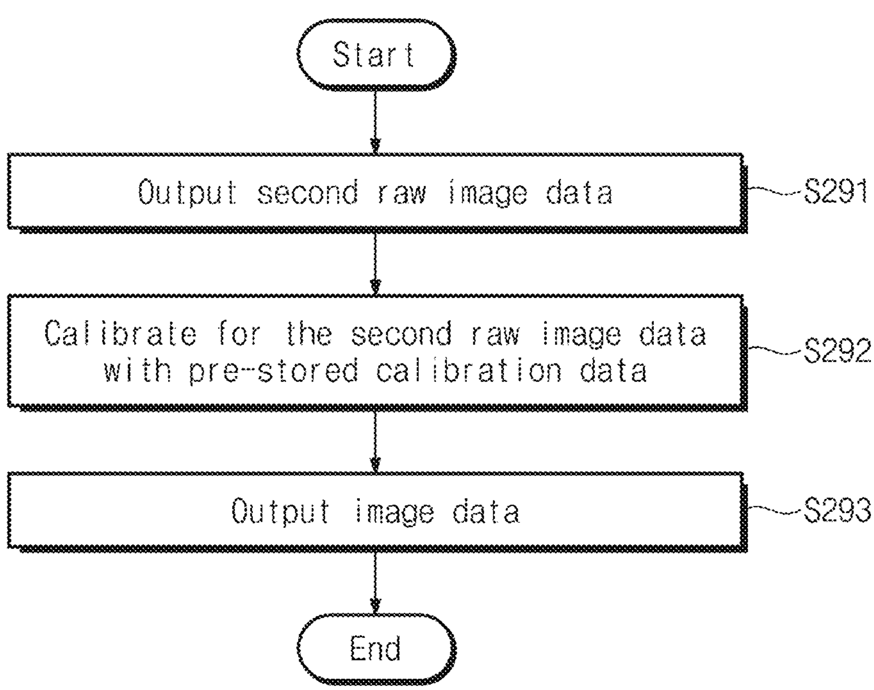
FIG. 8 is a flowchart illustrating an operating method where a camera module operates in a second operation mode, according to an exemplary embodiment of the present disclosure.

FIG. 8 is a flowchart illustrating an operating method where a camera module operates in a second operation mode, according to an exemplary embodiment of the present disclosure. In an exemplary embodiment, operations S291 to operation S293 of FIG. 8, constitute a detailed operation flow of operation S190 of FIG. 7.

Referring to FIGS. 1, 5, and 8, in operation S291, the image sensor 120 may output the second raw image data. The second raw image data may include color temperature data different from that of the first raw image data of FIG. 7.

In operation S292, the image signal processor 533 may calibrate the second raw image data based on the crosstalk calibration data stored in advance. In this case, the pre-processing block 532 may not perform the first to third operations on the second raw image data.

As described above, the crosstalk calibration data stored in advance may be one of the first crosstalk calibration data including one color temperature data or the second crosstalk calibration data including different color temperature data.

Although not illustrated, the image signal processor 533 may further perform the following operations on the calibrated image data: color correction, color interpolation, and bad pixel correction.

In operation S293, the binning block 535 or the remosaicing block 536 may receive the image data experiencing the image signal processing from the image signal processor 533. When the illuminance of light incident through the display 300 is low, the binning block 535 may perform binning on pixels having the same color filter and may output image data of the binning Bayer type.

When the illuminance of light incident through the display 300 is high, the remosaicing block 536 may perform remosaicing on pixels having the same color filter and may output image data of the remosaic Bayer type.

Figure 9:
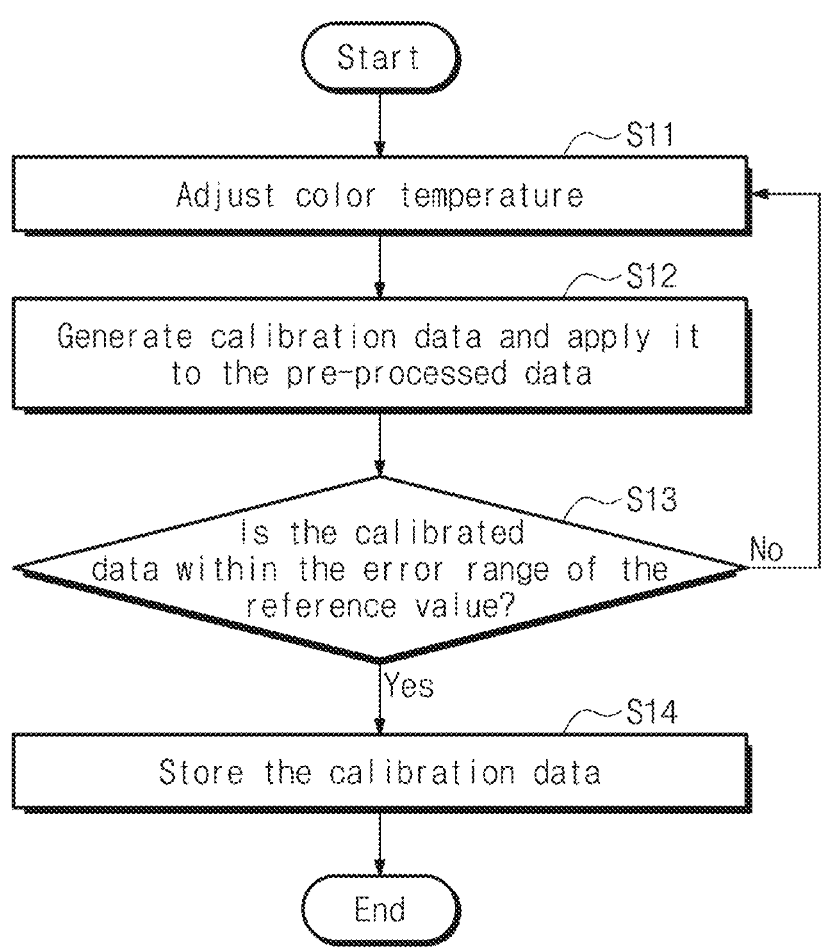
FIG. 9 is a flowchart illustrating an operating method where an electronic device stores crosstalk calibration data based on various color temperatures, according to an exemplary embodiment of the present disclosure.

FIG. 9 is a flowchart illustrating an operating method where an electronic device stores crosstalk calibration data based on various color temperatures, according to an exemplary embodiment of the present disclosure. In an exemplary embodiment, operation S12, operation S13, and operation S14 of FIG. 9 respectively correspond to operation S160, operation S170, and operation S180 of FIG. 7. Thus, additional description associated with similar operations will be omitted to avoid redundancy.

Referring to FIGS. 1, 5, and 9, in operation S11, the application processor 200 may adjust the intensity of light incident from the display 300 by using a brightness detect signal. The control logic 130 or 530 may receive the raw image data, which are variable depending on the intensity of light, from the image sensor 120 or 520. The raw image data may include color temperature data that are variable depending on the intensity of light.

In operation S12, the pre-processing block block 532 may generate different crosstalk calibration data for each raw image data, based on the pre-processed image data generated as a result of the first operation and the second operation. The pre-processing block 532 may apply the crosstalk calibration data for each pre-processed image data.

For example, third crosstalk calibration data may be applied to third pre-processed image data generated based on third raw image data. Fourth crosstalk calibration data may be applied to fourth pre-processed image data generated based on fourth raw image data. As in the above description, n-th crosstalk calibration data may be applied to an n-th processed image data generated based on n-th raw image data.

In operation S13, the pre-processing block 532 may compare result values, to which the crosstalk calibration data are applied, with the reference value and may determine a ratio of result values belonging to an error range. The pre-processing block 532 may perform the third operation based on the reference value and result values obtained by applying the crosstalk calibration data to the pre-processed image data. The reference value is described above, and thus, additional description will be omitted to avoid redundancy.

The pre-processing block 532 may perform the third operation and may calculate error values of the result values with respect to the reference value. When a ratio of the number of result values having an error value within the error value range of 3% to the number of the generated result values is 99% or more, there may be performed operation S14 in which the pre-processing block 532 sends the crosstalk calibration data to the memory and 140 or 540.

When a ratio of the number of result values having an error value within the error value range of 3% to the number of the generated result values is 99% or less, there may be performed operation S11 in which the pre-processing block 532 obtains the raw image data from the image sensor 120 or 520.

As operation S11 to operation S13 are repeatedly performed, the pre-processing block 532 may provide the memory 140 or 540 with the crosstalk calibration data corresponding to the case where a ratio of the number of result values having an error value within the error value range of 3% to the number of the generated result values is 99% or more.

In operation S14, memories 140 or 540 may store "m" crosstalk calibration data (m being a natural number less than "n"). Accordingly, compared to the case where the crosstalk of raw image data having various color temperatures are calibrated based on the first crosstalk calibration data associated with one color temperature (e.g., a color temperature of 5000K), the quality of image may be further improved when the crosstalk of the raw image data is calibrated by using "m" crosstalk calibration data associated with different color temperatures.

Figure 10:
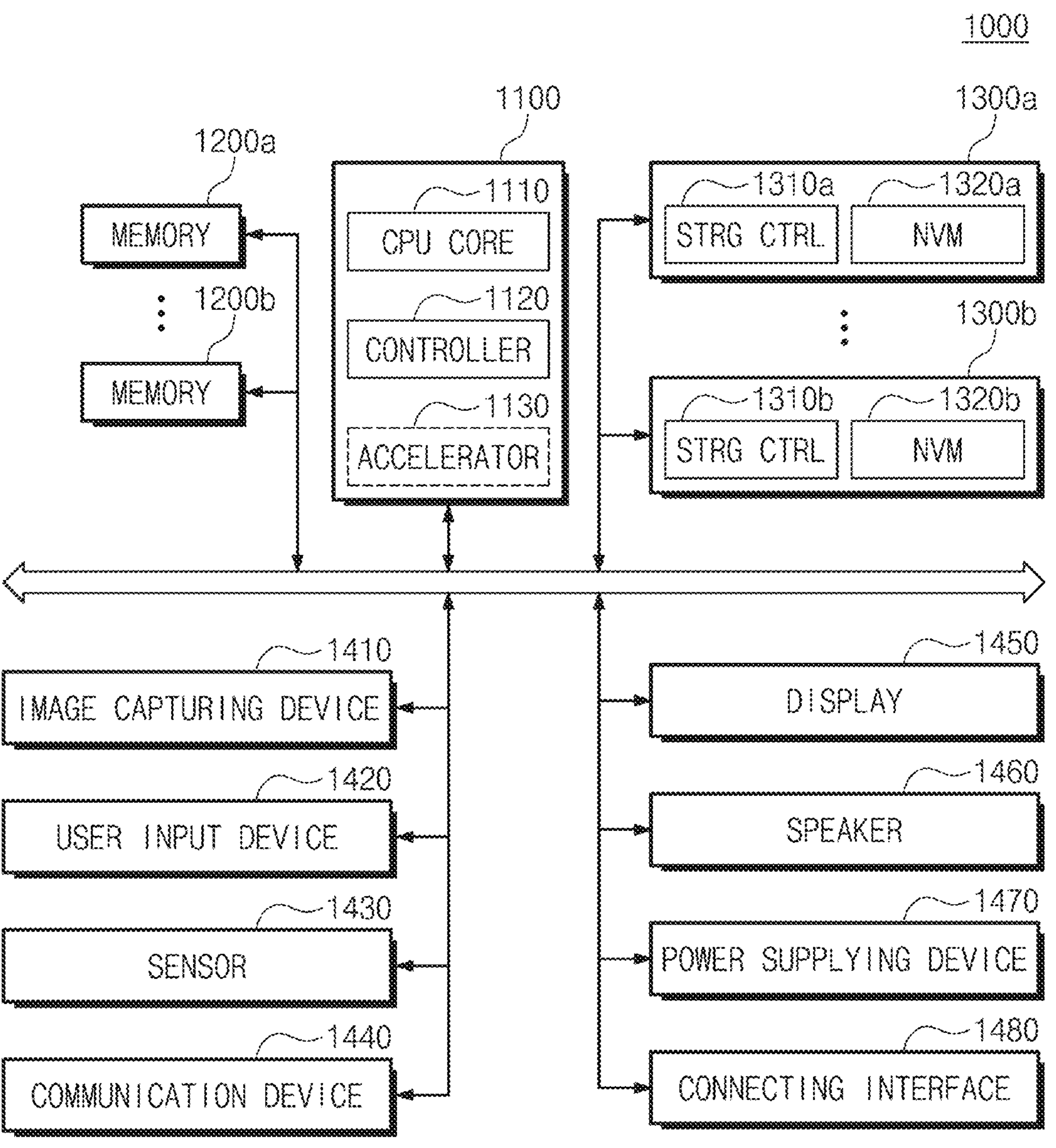
FIG. 10 is a diagram illustrating an electronic device to which a camera module according to an exemplary embodiment of the present disclosure is applied.

FIG. 10 is a diagram of an electronic device 1000 to which a camera module is applied, according to an exemplary embodiment. The electronic device 1000 of FIG. 10 may basically be a mobile device, such as a portable communication terminal (e.g., a mobile phone), a smartphone, a tablet personal computer (PC), a wearable device, a healthcare device, or an Internet of things (IOT) device. However, the electronic device 1000 of FIG. 10 is not necessarily limited to the mobile device and may be a PC, a laptop computer, a server, a media player, or an automotive device (e.g., a navigation device).

Referring to FIG. 10, the electronic device 1000 may include a main processor 1100, memories (e.g., 1200*a* and 1200*b*), and storage devices (e.g., 1300*a* and 1300*b*). In addition, the electronic device 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the electronic device 1000, more specifically, operations of other components included in the electronic device 1000. The main processor 1100 may be implemented as a general-purpose processor, a dedicated processor, or an application processor. The main processor 1100 may correspond to the application processor 200 of the present disclosure illustrated in FIG. 1.

The main processor 1100 may include at least one CPU core 1110 and further include a controller 1120 configured to control the memories 1200_a_ and 1200_b_ and/or the storage devices 1300_a_ and 1300_b_. The controller 1120 may correspond to the camera module controller 210 included in the application processor 200 of FIG. 1 according to the present disclosure.

In some exemplary embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200_a_ and 1200_b_ may be used as main memory devices of the electronic device 1000. Although each of the memories 1200_a_ and 1200_b_ may include a volatile memory, such as static random access memory (SRAM) and/or dynamic RAM (DRAM), each of the memories 1200_a_ and 1200_b_ may include non-volatile memory, such as a flash memory, phase-change RAM (PRAM) and/or resistive RAM (RRAM). The memories 1200_a_ and 1200_b_ may be implemented in the same package as the main processor 1100.

The storage devices 1300_a_ and 1300_b_ may serve as non-volatile storage devices configured to store data regardless of whether or not power is supplied thereto, and have larger storage capacity than the memories 1200_a_ and 1200_b_. The storage devices 1300_a_ and 1300_b_ may respectively include storage controllers (STRG CTRL) 1310_a_ and 1310_b_ and NVMs (Non-Volatile Memories) 1320_a_ and 1320_b_ configured to store data via the control of the storage controllers 1310_a_ and 1310_b_. Although the NVMs 1320_a_ and 1320_b_ may include flash memories having a two-dimensional (2D) structure or a three-dimensional (3D) V-NAND structure, the NVMs 1320_a_ and 1320_b_ may include other types of NVMs, such as PRAM and/or RRAM.

The storage devices 1300_a_ and 1300_b_ may be physically separated from the main processor 1100 and included in the electronic device 1000 or implemented in the same package as the main processor 1100. In addition, the storage devices 1300_a_ and 1300_b_ may have types of solid-state devices (SSDs) or memory cards and be removably combined with other components of the electronic device 100 through an interface, such as the connecting interface 1480 that will be described below. The storage devices 1300_a_ and 1300_b_ may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam. The image capturing device 1410 may correspond to one of the camera modules 100, 500, and 600 of FIGS. 1, 5, and 6.

The user input device 1420 may receive various types of data input by a user of the electronic device 1000 and include a touch pad, a keypad, a keyboard, a mouse, and/or a microphone.

The sensor 1430 may detect various types of physical quantities, which may be obtained from the exterior of the electronic device 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the electronic device 1000 according to various communication protocols. The communication device 1440 may include an antenna, a transceiver, and/or a modem.

The display 1450 and the speaker 1460 may serve as output devices configured to respectively output visual information and auditory information to the user of the electronic device 1000. The display 1450 may correspond to the display 300 of FIG. 1.

The power supplying device 1470 may appropriately convert power supplied from a battery (not shown) embedded in the electronic device 1000 and/or an external power source, and supply the converted power to each of components of the electronic device 1000.

The connecting interface 1480 may provide connection between the electronic device 1000 and an external device, which is connected to the electronic device 1000 and capable of transmitting and receiving data to and from the electronic device 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to an exemplary embodiment of the present disclosure, a camera module for calibration, an electronic device including the camera module, and an operating method of the camera module may perform calibration based on raw image data having various color temperatures. Accordingly, the quality of image having various color temperatures may be improved.

While the present disclosure has been described with reference to exemplary embodiments thereof, it will be apparent to those of skill in the art, that various changes and modifications may be made thereto without departing from the spirit and scope of the present disclosure as set forth in the appended claims.

What is claimed is:

1. A camera module comprising:

an image sensor including a plurality of pixels outputting raw image data based on light incident from at least one of a display or the exterior; and control logic configured to receive the raw image data and to generate image data, wherein the control logic is configured to:

turn off calibration of the image sensor in response that an amount of light measured by the image sensor is less than or equal to one threshold value and that a value indicating a distance between a depth sensor and the display detected by the depth sensor is less than or equal to another threshold value;

after turning off the calibration of the image sensor, receive first raw image data, which are based on light incident from the display, from the image sensor;

obtain first code values respectively corresponding to first output values included in the first raw image data from among code values respectively corresponding to output values of the image sensor based on first color temperature data from the first raw image data;

generate a first ratio value group of the first output values for each of the first code values;

generate crosstalk calibration data based on the first ratio value group; and after generating the crosstalk calibration data based on the first ratio value group, turn on the calibration of the image sensor.

2. The camera module of claim 1, further comprising:

a memory configured to store the crosstalk calibration data.

3. The camera module of claim 1, wherein the control logic includes:

a color temperature detect block configured to detect the first color temperature data, and wherein, the control logic determines to send crosstalk calibration data, which are based on the first color temperature data, to a memory based on the crosstalk calibration data and a result of processing remaining output values other than some of the first output values.

4. The camera module of claim 3, wherein the control logic further includes:

a register configured to store the code values; and a pre-processing block configured to receive the first code values respectively corresponding to the first output values from among the code values based on the first color temperature data.

5. The camera module of claim 4, wherein the pre-processing block is further configured to:

compare each of first ratio values included in the first ratio value group with a first threshold value and a second threshold value; and select output values having a first ratio value being the first threshold value or less and the second threshold value or more from among the first output values.

6. The camera module of claim 5, wherein the pre-processing block is further configured to:

select, as a reference value, a code value corresponding to the greatest number of the output values selected by the pre-processing block from among the first code values.

7. The camera module of claim 6, wherein the pre-processing block is further configured to:

generate pre-processed image data based on output values, which have a first ratio value being the first threshold value or less and the second threshold value or more with respect to the reference value, from among the first output values; and generate crosstalk calibration data based on the output values of the pre-processed image data.

8. The camera module of claim 7, wherein the pre-processing block is further configured to:

generate result values based on the crosstalk calibration data and the output values; and generate a group of error ratio values of the result values with respect to the reference value.

9. The camera module of claim 8, wherein the pre-processing block is further configured to:

compare each of the error ratio values included in the group with a third threshold value and a fourth threshold value; and send the crosstalk calibration data to a memory when a second ratio value of pixels, which have an error ratio value being the third threshold value or less and the fourth threshold value or more, from among pixels corresponding to the result values is a fifth threshold value or more.

10. An operating method of a camera module, the method comprising;

outputting raw image data, by an image sensor including a plurality of pixels included in the camera module; and generating crosstalk calibration data, by control logic included in the camera module, wherein the generating the crosstalk calibration data includes:

turning off calibration of the image sensor in response that an amount of light measured by the image sensor is less than or equal to one threshold value and that a value indicating a distance between a depth sensor and a display detected by the depth sensor is less than or equal to another threshold value;

after turning off the calibration of image sensor, receiving first raw image data from the image sensor;

obtaining first code values respectively corresponding to first output values included in the first raw image data from among code values respectively corresponding to output values of the image sensor based on first color temperature data from the first raw image data; generating a first ratio value group of the first output values for each of the first code values; generating the crosstalk calibration data based on the first ratio value group; and after generating the crosstalk calibration data based on the first ratio value group, turning on the calibration of the image sensor.

11. The method of claim 10, wherein the outputting of the raw image data by the image sensor includes:

outputting the raw image data based on light incident from at least one of the display or the exterior, and wherein the image sensor outputs the first raw image data based on the light incident from the display.

12. The method of claim 10, wherein the control logic includes:

a color temperature detect block configured to detect the first color temperature data from the first raw image data; and a pre-processing block configured to receive the first code values respectively corresponding to the first output values from among a plurality of the code values stored in a register based on the first color temperature data.

13. The method of claim 12, wherein the generating of the first ratio value group includes:

comparing each of first ratio values included in the first ratio value group with a first threshold value and a second threshold value, by the pre-processing block; and selecting output values having a first ratio value being the first threshold value or less and the second threshold value or more from among the first output values.

14. The method of claim 13, wherein the selecting of the output values includes: selecting, as a reference value, a code value corresponding to the greatest number of the output values selected by the pre-processing block from among the first code values, by the pre-processing block.

15. The method of claim 14, wherein the selecting of the output values includes:

generating pre-processed image data based on output values, which have a first ratio value being the first threshold value or less and the second threshold value or more with respect to the reference value, from among the first output values, by the pre-processing block; and generating crosstalk calibration data based on the output values of the pre-processed image data, by the pre-processing block.

16. An electronic device comprising:

a camera module;

a display through which light is incident onto the camera module; and an application processor configured to receive image data from the camera module and to output an output image, wherein the camera module includes:

a memory;

a depth sensor configured to detect a distance from the display and to generate a distance value;

an image sensor including a plurality of pixels outputting raw image data; and control logic configured to receive the raw image data and to generate image data, wherein the image sensor is configured to:

output first raw image data including first color temperature data based on light incident from the display, and wherein the control logic is configured to:

turn off calibration of the image sensor in response that an amount of light measured by the image sensor is less than or equal to one threshold value and that the distance value from the depth sensor is less than or equal to another threshold value;

after turning off calibration of the image sensor, receive the first raw image data from the image sensor;

obtain first code values respectively corresponding to first output values included in the first raw image data from among code values respectively corresponding to output values of the image sensor based on the first color temperature data from the first raw image data;

generate a first ratio value group of the first output values for each of the first code values;

generate crosstalk calibration data based on the first ratio value group; and after generating the crosstalk calibration data based on the first ratio value group, turn on the calibration of the image sensor.

17. The electronic device of claim 16, wherein the control logic is configured to:

compare the distance value from the depth sensor with a sixth threshold value; and generate the crosstalk calibration data in response to a distance value that is the sixth threshold value or less.

* * * * *